US007852499B2

(12) United States Patent
Déjean

(10) Patent No.: US 7,852,499 B2
(45) Date of Patent: Dec. 14, 2010

(54) CAPTIONS DETECTOR

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1113 days.

(21) Appl. No.: 11/528,261

(22) Filed: Sep. 27, 2006

(65) Prior Publication Data

US 2008/0077847 A1 Mar. 27, 2008

(51) Int. Cl.
*G06F 15/00* (2006.01)
*G06F 3/00* (2006.01)
(52) U.S. Cl. ...................... 358/1.13; 715/204
(58) Field of Classification Search ............... 358/1.13, 358/1.15, 1.14, 1.16, 1.12, 302, 3.09, 3.2; 715/234, 201, 227, 90, 229, 204, 247, 210, 715/209, 711; 382/172, 170, 218, 180, 181, 382/176, 229, 159; 399/3, 79
See application file for complete search history.

(56) References Cited

U.S. PATENT DOCUMENTS

| | | | |
|---|---|---|---|
| 5,892,843 A * | 4/1999 | Zhou et al. | 382/176 |
| 6,687,404 B1 * | 2/2004 | Hull et al. | 382/226 |
| 6,694,053 B1 * | 2/2004 | Burns et al. | 382/176 |
| 6,826,305 B2 | 11/2004 | Zhu | |
| 2004/0006742 A1 | 1/2004 | Slocombe | |
| 2005/0262539 A1 | 11/2005 | Barton et al. | |

OTHER PUBLICATIONS

Mittal et al., "Describing Complex Charts in Natural Language: A Caption Generation System," Special Issue on Natural Language Generation 24(3), pp. 431-467 (1998).
Corio et al., "Generation of Texts for Information Graphics," In Proc. of the 7th European Workshop on Natural Language Generation (1999).
Foster, "Automatically Generating Text to Accompany Information," 1999.
U.S. Appl. No. 11/517,092, filed Sep. 7, 2006, Dejean et al.
U.S. Appl. No. 11/451,525, filed Jun. 12, 2006, Vion-Dury.

* cited by examiner

*Primary Examiner*—Saeid Ebrahimi Dehkordy
(74) *Attorney, Agent, or Firm*—Fay Sharpe LLP

(57) ABSTRACT

To detect captions in a document that includes text fragments and objects of interest, a signature is assigned to each text fragment. The signature is the value for that text fragment of a text fragment representation comprising at least one text fragment attribute. A caption signature is identified as a signature assigned to a substantial number of text fragments that are near at least one object of interest in the document. One or more captions are detected as one or more text fragments each assigned a caption signature.

22 Claims, 2 Drawing Sheets

Example Signature-Nearness Association Table

| Signature | Number of Text Fragments Near An Object of Interest | Number of Text Fragments NOT Near An Object of Interest |
|---|---|---|
| Font Size = 9 | 0 | 8 |
| Font Size = 10 | 17 | 2 |
| Font Size = 12 | 15 | 402 |
| Font Size = 14 | 1 | 4 |

*FIG. 2*

Example Text Fragment Representation Refinement Schedule

| Refinement Level | Text Fragment Representation |
|---|---|
| 1 | Font Size |
| 2 | Font Attribute |
| 3 | First Token |
| 4 | First Token + Font Attribute |

*FIG. 3*

CAPTIONS DETECTOR

BACKGROUND

The following relates to the document processing arts. It particularly relates to document conversion and structuring techniques, and is described with particular reference thereto. However, the following relates more generally to automated document analysis and processing techniques.

There is continuing interest in document conversion to facilitate use of legacy documents and document databases. A given document is typically generated and utilized in a format that is appropriate for that type of document. For example, a text-based document may be generated and utilized in a word processing application format, while a table may be generated and utilized in a spreadsheet format, and so forth. Documents can be converted from one format to another in part or in its entirety. New application programs are continually being developed and revised, while older application programs become obsolete. The overall consequence is a large number of legacy documents in different formats, some of which may become less readily accessed as the underlying application programs, or earlier versions of such application programs, fall out of common use.

Document conversion is the process of converting current and/or legacy documents into a common format that is intended to be cross-platform compatible and less prone to obsolescence. If the common format is a structured format such as XML (that is, extensible markup language), HTML (that is, hypertext markup language), SGML (that is, standard generalized markup language), or so forth, then the document conversion also advantageously facilitates indexing, searching, structuring, or other organization of the converted documents or databases of documents. Typically, document conversion entails an initial conversion of the document to text fragments, which may be nested or otherwise organized, for example by paragraph, section, page, or so forth. The document being converted typically also contains objects such as images, figures, gridded tables, and so forth which either cannot be represented as text fragments (as is typically the case for bitmapped images, for example) or are more appropriately represented as grouped objects (as is typically the case for gridded tables, for example). During conversion, objects that cannot be represented as text fragments are suitably stored in their native format, either embedded in the converted document or separately stored and linked to a suitable location in the converted document by a pointer or other link. Objects conducive to storage as grouped objects are grouped and stored as a grouped object (such as a table) that is suitably tagged.

Captions present a known problem for document conversion. A caption, such as a short explanation, annotation, description, legend, or so forth accompanying an image, figure, or other object, is typically converted as one or more text fragments during the initial document conversion processing. However, the caption is not a part of the general flow of text. Accordingly, if the caption is not recognized and addressed during document conversion it causes an abrupt break in the reading flow, and additionally leaves the associated object unlabeled or unidentified.

Existing techniques for identifying captions have certain drawbacks. In one approach, the text fragment immediately below (or above) an object is assumed to be the caption for that object. A drawback of this approach is that it assumes that there is in fact a caption, and it further assumes a specific geometrical relationship between the caption and the associated object (such as below or above the object). The approach fails if either assumption is incorrect. Moreover, a caption such as an annotation that includes a contiguous group of text fragments may be misidentified by this approach.

Another approach is to use a pre-selected keyword or other pre-selected heuristic to identify captions. For example, it may be assumed that a figure caption is any text fragment of the form "Fig. $ . . . " where "$" is a placeholder indicating a number or other enumerator and " . . . " indicates any following text. A drawback of this approach is that it may be over-inclusive (for example, it would not be uncommon for a normal paragraph to begin with the aforementioned form "Fig. $ . . . " if the paragraph references the figure) or under-inclusive (for example, if the document uses a different format for captions than the pre-selected keyword or heuristic, such as using "Diagram $ . . . " in place of "Fig. $ . . . "). Again, the assumptions involved in this approach lead to limited applicability and susceptibility to errors in identifying the captions.

Accordingly, there remains an unfulfilled need in the art for improved and robust techniques for identifying or detecting captions.

CROSS REFERENCE TO RELATED PATENTS AND APPLICATIONS

The following related U.S. patent applications that commonly owned with the present application are each incorporated herein by reference:

Dejean et al., U.S. application Ser. No. 11/517,092 filed Sep. 7, 2006, entitled "Methods and Apparatuses for Detecting and Labeling Organizational Tables in a Document" is incorporated herein by reference in its entirety. This application relates at least to identifying organizational tables such as Tables of Contents, Tables of Tables, Tables of Figures, and so forth in documents, along with links to captions, chapter or section headings, or other associated elements in the body of the document.

Vion-Dury, U.S. application Ser. No. 11/451,525 filed Jun. 12, 2006, entitled "Methods and Apparatuses for Finding Rectangles and Application to Segmentation of Grid-Shaped Tables" is incorporated herein by reference in its entirety. This application relates at least to identifying tables in documents.

BRIEF DESCRIPTION

According to aspects illustrated herein, there is provided a method for detecting captions in a document that includes text fragments and objects of interest. A signature is assigned to each text fragment. The signature is the value for that text fragment of a text fragment representation comprising at least one text fragment attribute. A caption signature is identified as a signature assigned to a substantial number of text fragments that are near at least one object of interest in the document. One or more captions are detected as one or more text fragments each assigned a caption signature.

According to aspects illustrated herein, there is provided a system for detecting captions in a document that includes text fragments and objects of interest. A signatures assignor is configured to assign for each text fragment a signature comprising the value for that text fragment of a text fragment representation comprising at least one text fragment attribute. A near property processor is configured to assign a near property for each text fragment. The near property has a near value if the position of the text fragment respective to objects of interest in the document satisfies a near criterion and a value other than the near value otherwise. A caption signature identifier is configured to identify at least one caption signature based on the near property values of text fragments assigned that signature. A caption detector is configured to identify as captions those text fragments assigned the caption signature.

According to aspects illustrated herein, there is provided a method for detecting captions in a document that includes text fragments and objects of interest. A caption signature is identified that is correlative with text fragments that are near at least one object of interest. The caption signature is a value of a text fragment representation comprising at least one text fragment attribute. One or more captions are detected as one or more text fragments for which the value of the text fragment representation equals the caption signature.

BRIEF DESCRIPTION OF THE DRAWINGS

FIG. 2 shows an example signature-nearness association table.

FIG. 3 shows an example text fragment representation refinement schedule.

DETAILED DESCRIPTION

Figure 1:
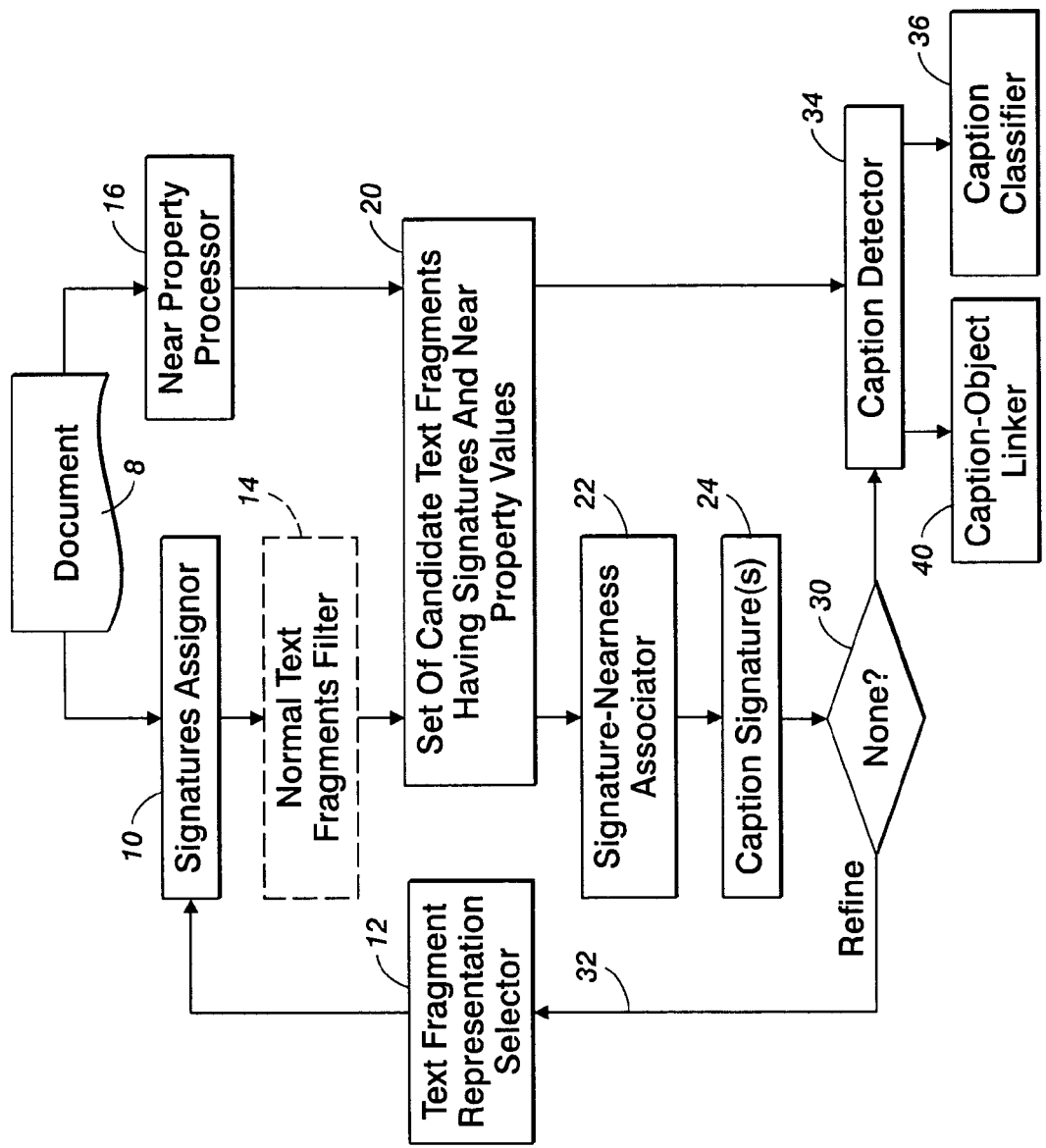
FIG. 1 diagrammatically shows a caption detector system.

As used herein, the term "object" encompasses any document element that is not a text fragment. Object can be of various object types, such as an image, figure, drawing, table, grid, or so forth. An object may be represented in the document as a non-text element such as a bitmapped image or by a link to an externally stored bitmapped image. An object such as a table may also be represented as a tagged grouping of text elements, or an object such as a gridded table may be represented by a tagged grouping of text and non-text elements—for example, the gridded table may be represented by a grouping of vector-based gridlines and text elements. Objects are typically tagged at least insofar as they are identified as being something other than a text fragment. In some documents, tags may identify different object types, such as an image tag that identifies the object as an image. The term "object of interest" typically encompasses all objects of a document, regardless of object type. In some embodiments, however, the objects of interest may be a sub-set of the objects of the document. For example, if objects are tagged by object type, then the objects of interest may be only those objects of a certain selected object type or selected group of object types.

The term "caption" encompasses object labels such as an object title, description, explanatory text, legend, annotation, or so forth. Captions are typically represented in the document as a text fragment or group of (typically contiguous) text fragments that are near to an object. A caption is not part of the reading flow of text, but rather is associated with an object. A caption is typically near the corresponding object, but is not necessarily the nearest text fragment to the corresponding object. For example, when a figure is embedded in text, an adjacent portion of the text flowing around the figure may be closer to the figure than the caption.

With reference to FIG. 1, a document 8 is to be analyzed. The document 8 comprises text fragments and objects, including objects of interest. The objects of interest are those objects that are expected to have associated captions. Typically, all objects in the document 8 are objects of interest; however, it is contemplated for the objects of interest to be less than all the objects of the document 8. For example, the objects of interest may exclude horizontal lines used in the document to denote section breaks. Optionally, the document 8 may have undergone pre-processing such as format conversion, text fragmentation, or so forth to place it into a suitable format comprising text fragments and objects. In some embodiments, the document 8 is in a shallow structured format such as XML, HTML, SGML, or so forth.

Each text fragment of the document 8 is assigned a signature by a signatures assignor 10. The assigned signature for each text fragment comprises the value for that text fragment of a text fragment representation selected by a text fragment representation selector 12. The text fragment representation comprises at least one text fragment attribute, such as for example: a text fragment style attribute such as a font size, a font type, or a font attribute (such as boldface, underscored, italic, or so forth); a first text fragment token value (that is, for example, the first word in the text fragment); a last text fragment token value; or so forth. The text fragment attribute or attributes used for the text fragment representation are optionally selected so as to reduce or eliminate preconceptions about the content or form of the captions or other text. For example, using the first text fragment token as a text fragment attribute of the text fragment representation does not impose any preconception on what that first token should be (this is in contrast to a heuristic approach which may, for example, look for a specific first token such as "Figure", or "Fig.", or so forth to indicate a figure caption). The only assumption made is that the first token may be indicative of a caption. As will be described, by iterating through different text fragment representation refinements, even this general assumption can be made less limiting. The signature of a text fragment provides concise general information about the text fragment without presuppositions as to specific values of that information.

The text fragment attribute or attributes selected for the text fragment representation are also selected to provide information that is likely to result in grouping together text fragments that are captions under a common signature. For example, the position coordinates (x,y) of the text fragment in the page is an attribute, but is not an attribute that is likely to result in grouping together text fragments that are captions, since in general a caption may appear anywhere in the page. Some suitable text fragment attributes for inclusion in the text fragment representation include, for example: font size, font type or font name, font color, or a binary font attribute such as bold, underscore, or italic (these attributes are binary in that they are either "on" or active, or "off" or inactive). Such attributes are sometimes used to set off a caption from surrounding text in a document. Other suitable text fragment attributes include the first token of the text fragment, or the last token of the text fragment. The text fragment representation is suitably a single text fragment attribute or a concatenation or other combination of two or more text fragment attributes. Typically, around one to three text fragment attributes are sufficient to characterize a caption. For a text fragment having content "The first section of this document is the introduction." with font size 9, font color #000000, and font type or font name "Times New Roman", some examples of possible signatures using a text fragment representation comprising a single text fragment attribute are:

font-size=9, or font-color=#000000, or font-name="Times New Roman"

or first-token="The"

Some examples of two-text fragment attribute signatures for the text fragment having content "The first section of this document is the introduction." with font size 9, font color #000000, and font type or font name "Times New Roman", are:

font-size=9+font-color=#000000, or font-size=9+font-name="Times New Roman"

or font-size=9+first-token="The"

where the symbol "+" indicates concatenation of the two text fragment attributes. In some embodiments, the text fragment representation includes a normalization. For example, a suitable text fragment representation might be the second text fragment token in which all numerals 0 . . . 9 are replaced by a substitute symbol such as "$". Thus, a text fragment such as "FIG. 12—The basic system" would have the signature "$$" corresponding to the second token "12" with the numerals replaced by dollar signs.

The text fragment representation is selected to produce signatures that are likely to group together text fragments that make up captions. For documents that are made up mostly of text in the form of paragraphs or the like, captions are relatively infrequent while "normal text" is predominant. For a well-selected text fragment representation, text fragments of normal text typically have the same signature. For example, consider a text fragment representation comprising the font size attribute. A typical document may represent normal text using a normal text font having, for example, 12 point text. In the same document, the captions may be represented using a different font size, such as 10 point text. Most text fragments of the document are normal text with the signature font-size=12, while infrequent text fragments corresponding to the occasional caption have the signature font-size=10. There may be occasional interspersed text fragments with different signatures, such as an occasional title with a font size larger than 12 point, which will have neither signature font-size=10 nor font-size=12. In such an example document, the most common text fragment signature is font-size=12, and text fragments with font-size=12 are not captions.

Accordingly, in some embodiments, a normal text fragments filter 14 is optionally provided, which processes the signatures to identify text fragments having the most common signature as normal text fragments. These normal text fragments are excluded from further consideration as captions. Because the "normal text" may change in different sections of a document, in some embodiments the optional normal text fragments filter 14 operates on a per-page basis or on the basis of another portion or section definition. Thus, for each page a most common signature is identified as the "normal text" signature for that page, and text fragments with that signature are excluded from further consideration as captions. Different pages may have different normal text signatures. The operation of the optional normal text fragments filter 14 can have other variations; for example, application of the filter 14 may be skipped for pages having too few text fragments, since with only a few text fragments the most common signature may not be indicative of normal text. (For example, a page including two large figures that fully occupy the page may include only two text fragments corresponding to the two captions of the two figures).

The assigned signatures identify groupings of text fragments. The text fragments in any one group identified by a common signature have one or more similarities that may or may not be indicative of captions. The signatures, considered alone, are typically insufficient to identify which grouping or groupings of text fragments are captions. To determine which signatures are caption signatures (that is, signatures that group together text fragments that correspond to captions), consideration is given to how close text fragments of a given grouping (i.e., signature) are to objects of interest. This reflects the expectation that a caption is likely to be located near to the object that is being described or otherwise captioned.

Accordingly, with continuing reference to FIG. 1 a near property processor 16 assigns a near property for each text fragment. The near property has a near value if the position of the text fragment respective to objects of interest in the document satisfies a near criterion and a value other than the near value otherwise. One example near criterion is satisfied conditional upon there being no intervening text fragments between text fragment for which the near property is being computed and at least one object of interest. This example near criterion reflects the expectation that the caption will be adjacent the corresponding object. Note that this example near criterion is not conditional upon the text fragment for which the near property is being computed being closest in distance to the object. Accordingly, this example near criterion correctly identifies a caption as near its corresponding object even in the case of an embedded object with normal text flowing around the object that may be closer to the object than the caption. If the objects of interest include more than one object type, the example near criterion ignores the object type.

To account for pagination errors, it is contemplated for this example near criterion to also be satisfied conditional upon (i) the text fragment for which the near property is being computed being at the top of a page and (ii) an object of interest being at the very bottom of the preceding page, or to be satisfied conditional upon (i) the text fragment for which the near property is being computed being at the bottom of a page and (ii) an object of interest being at the very top of the next page. Similarly, to account for spacing errors, it is contemplated for this example near criterion to also be satisfied conditional upon the text fragment for which the near property is being computed overlapping an object of interest.

It is to be understood that the example near criterion and its disclosed variants are illustrative. Other near criteria can be used, such as a quantitative distance criterion. For example, a quantitative distance criterion can be defined that is satisfied conditional upon the text fragment for which the near property is being computed being within a distance threshold from an object of interest.

The output of the signatures assignor 10, the optional normal text fragments filter 14, and the near property processor 16 is a set of candidate text fragments 20 having signatures and near property values. The signatures identify groupings of text fragments, in which the text fragments of each grouping have one or more similarities possibly indicative of the text fragments being captions. Moreover, a reasonable expectation is that the near property values of the text fragments of any grouping of text fragments that are captions will indicate that a substantial number of those text fragments are near at least one object of interest. Thus, for each signature it is useful to determine an indication or association of how many (or, in probabilistic or statistical terms, how likely) it is that text fragments with that signature are near an object of interest.

Accordingly, with continuing reference to FIG. 1 and with further reference to FIG. 2, a signature-nearness associator 22 determines a signature-nearness association table, such as the example signature-nearness association table 23 shown in FIG. 2. For each signature, the signature-nearness association table tabulates how many text fragments assigned that signature are near an object of interest, and how many text fragments assigned that signature are not near an object of interest. The illustrative example near property has a near value if there are no intervening text fragments between text fragment for which the near property is being computed and at least one object of interest, and has a value other than the near value otherwise. Accordingly, text fragments of a given signature having the near value are counted as text fragments that are near an object of interest, while text fragments of the given signature having other than the near value are counted as text fragments that are not near an object of interest. In some other contemplated embodiments, the near property may be other than a binary-valued property, in which case the signature-nearness association table may use thresholding or another technique to determine whether a given value of the near property indicates that that text fragment is near an object of interest.

The example signature-nearness association table 23 shown in FIG. 2 illustrates an example in which the text fragment representation comprises a single text fragment attribute, namely the font size. The signature font-size=9 identifies a group of eight text fragments having 9 point font size, and none of these text fragments is near an object of interest. Accordingly, it is concluded that the signature font-size=9 is not a caption signature. For example, the text fragments with 9 point font size may be small-font text indexing information in the top or bottom margin of the page. Similarly, the signature font-size=14 identifies a group of five text fragments having 14 point font size, and only one of these text fragments is near an object of interest. Again, it is readily concluded that the signature font-size=14 is not a caption signature. For example, the text fragments with 14 point font size may be headings or the like.

On the other hand, the signature font-size=10 identifies a group of nineteen text fragments having 10 point font size, and all but two of these text fragments are near an object of interest. Accordingly, it is readily concluded that the signature font-size=10 is a caption signature. That is, text fragments with font-size=10 are identifiable as captions. Note that this conclusion is arrived at without any a priori assumption about which font size is used for captions.

To complete discussion of the example signature-nearness association table 23 shown in FIG. 2, the signature font-size=12 identifies a group of 417 text fragments having 14 point font size. Of this large number of text fragments, fifteen are near an object of interest, while 402 are not near an object. Accordingly, it is again readily concluded that the signature font-size=14 is not a caption signature. Indeed, it is likely that the signature font-size=12 is the normal text signature which in some embodiments is filtered out by the optional normal text fragments filter 14. This optional filtering is indicated in FIG. 2 by showing the information for signature font-size=12 in grayed text—in embodiments employing the filter 14, the signature font-size=12 row of signature-nearness association table 23 is omitted because the text fragments having the normal signature font-size=12 are not considered by the signature-nearness associator 22 as potential captions.

With continuing reference to FIG. 1, the signature-nearness associator 22 preferably operates in an automated fashion in which the identification of a given signature as a caption signature 24 is based on an automated identification criterion. In some embodiments, a chi square test is suitably used. Signatures with low frequency (less than 5 in too many cells) are merged into one class (other tests such as Fisher's test can be used when the number of cases is too low). When the chi square is large enough (in some embodiments for p<0.001), cells are identified as positively correlated (the near value frequency is higher than the "otherwise" or "not near" value frequency) and hence the signature is identified as a caption signature.

In the foregoing, only one a priori assumption was made, namely that the font size is used in the document 8 to set off captions. This assumption is implicit in signatures defined by values of a text fragment representation made up only of a font size attribute (in the example of FIG. 2). However, captions may be set off in other ways, such as by font type, font attribute (e.g., bold, underline, italic, or so forth), or by a keyword such as "Figure". Moreover, different documents may in general use different textual attributes and/or keywords to set off captions. Thus, the initial a priori assumption that font size is used to set off captions may be incorrect. Accordingly, at a decision block 30, it is determined whether the present signatures have resulted in identification of a caption signature 24. If not, then the a priori assumption is likely incorrect, and processing flow feeds back along a refinement path 32 back to the text fragment representation selector 12, which selects a different text fragment representation embodying a different a priori assumption about what is used to set off captions. The new text fragment representation is used by the signatures assignor 10 to assign a different set of signatures to the text fragments, and processing continues through elements 14 (optionally), 20, and 22 until one or more caption signatures 24 are identified.

With reference to FIG. 3, a suitable refinement schedule implemented by the decision block 30, refinement path 32, and the text fragment representation selector 12 is described. The initial text fragment representation comprises the font size text fragment attribute, as already described. If this choice fails to identify a caption signature, then at the next level of refinement a text fragment representation comprising font attribute (e.g., bold, underscored, italic) is selected. This refinement reflects the recognition that another common way of setting of captions is using a specialized font attribute. If this level of refinement also fails to identify a caption signature, the third level of refinement in the example refinement schedule of FIG. 3 is to have the text fragment representation comprise the first token of the text fragment. This refinement reflects the recognition that yet another common way of setting of captions is using a keyword such as "Figure". Note that the specific keyword is not assumed; rather signatures using the level 3 text fragment representation merely consider the possibility that captions are set off by some sort of first-token keyword. At the fourth level of refinement of the example refinement schedule of FIG. 3, the third level text fragment representation (comprising the first token) is refined by adding or concatenating an additional text fragment attribute, namely the font attribute. This refinement reflects the recognition that captions may be set off not merely by a keyword alone, but rather by a keyword presented with a specific font attribute (e.g., "Figure" in italics, rather than merely "Figure").

The refinement schedule of FIG. 3 is an illustrative example. In some embodiments, signatures are initially based on text fragment representations comprising layout information or attributes (e.g., font size, font type, font attribute), and, if no caption signature is detected by these signatures, the text fragment representation is refined to be comprised of textual information or attributes (e.g., first token or last token). Further refinement may be optionally achieved by using mixed information (e.g., first token combined with font attribute). Another kind of refinement that can be made is based on changing the near criterion rather than the text fragment representation used to derive the signatures. For example, initially the near criterion may be conditional upon having no intervening text fragments between the text fragment whose near property is being computed an at least one object of interest, in any direction. This near criterion may be refined, for example, by considering only one direction, such as considering only objects of interest above or below the text fragment whose near property is being computed, but not to the left or right.

With returning reference to FIG. 1, if the signature-nearness associator 22 identifies a caption signature 24, then this caption signature 24 is used by a caption detector 34 to detect one or more captions as one or more text fragments each assigned the caption signature 24. In some embodiments, the signature-nearness associator 22 may identify two or more different caption signatures 24. For example, if the signatures are values of a text fragment representation comprising the first token, then it may be that the signature first-token="Figure" and the signature first-token="Table" may both be identified as caption signatures by the signature-nearness associator 22. Similarly, if italics are used to set off figure captions while bold text is used to set off table captions, then the signature font-attribute="Italic" and the signature font-attribute="Bold" may both be identified as caption signatures. If the objects are labeled by object type, then optionally in such a situation the caption detector 34 may use the object type of the proximate objects for text fragments of each signature to associate each signature with an object type.

In some embodiments, a caption classifier 36 classifies captions by type to distinguish, for example, a simple one-line caption from a more complex multi-line annotation. For example, if several textual elements with the same caption signature occur around a same image, they are classified as annotation. Similarly, several contiguous textual elements with the same caption signature may be classified as an annotation. Similarly, textual elements having a caption signature and content that comprises unique numerical values may be classified as an identifier or enumerator. Textual elements having a caption signature and not being classified as either an annotation or an identifier are suitably classified as a simple one-line caption.

In some embodiments, a caption-object linker 40 links the detected captions with their associated objects. A suitable algorithm for making such links is as follows:

for a given object, select all the near text fragments based on the near criterion used by the near property processor 16;
    for each of these near text fragments,
        i. If its signature is a caption signature 24,
        ii. Then link it as caption of the given object.

An actually constructed caption detector implementing a caption detection technique substantially similar to the technique implemented by the system of FIG. 1 was evaluated using several documents covering the situations of: (i) having images without captions; (ii) having both images with captions and images without captions; (iii) layout used for captions also used for other elements of the document; (iv) captions that are not of shortest distance from the associated object; and (v) captions shared by more than one object. The method showed good precision and recall (>90%). Observed errors were mainly due to inaccurate paragraph recognition, such as when a caption merged into the body of a paragraph. A test conducted with a document in which the images had no captions indicated that the method detects few false positives.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. Method for detecting captions in a document that includes text fragments and objects of interest, the method comprising:
    assigning a signature to each text fragment, the signature being the value for that text fragment of a text fragment representation comprising at least one text fragment attribute;
    computing a near property for each text fragment, the near property having a near value if the proximity of the text fragment to at least one object of interest in the document satisfies a near criterion and a value other than the near value otherwise;
    identifying a caption signature as a signature assigned to a substantial number of text fragments that are near at least one object of interest in the document, the near property being used in the identifying to recognize text fragments that are near at least one object of interest in the document, wherein the identifying includes computing a signature-nearness association score for each signature indicative of a strength of association of the signature with text fragments having the near value; and
    detecting one or more captions as one or more text fragments each assigned a caption signature.

2. The method as set forth in claim 1, further comprising:
    identifying the objects of interest as objects of the document having at least one object type selected from the group of object types consisting of image, figure, drawing, table, and grid.

3. The method as set forth in claim 1, wherein the at least one text fragment attribute of the text fragment representation is selected from at least one of:
    (i) a text fragment style attribute group consisting of font size, font type, and font attribute,
    (ii) a first text fragment token value, and
    (iii) a last text fragment token value.

4. The method as set forth in claim 1, further comprising:
    conditional upon the identifying initially not identifying any caption signatures, repeating the assigning and identifying wherein the repeated assigning employs a different text fragment representation.

5. The method as set forth in claim 4, wherein the different text fragment representation comprises the initial text fragment representation with at least one additional text fragment attribute.

6. The method as set forth in claim 1, wherein the document includes objects of a plurality of different object types, and the objects of interest include all objects in the document regardless of object type.

7. The method as set forth in claim 1, further comprising:
    conditional upon the identifying initially not identifying any caption signatures, repeating the computing of the near property and the identifying wherein the repeated computing of the near property employs a different near criterion.

8. The method as set forth in claim 1, further comprising:
    for each of a plurality of selected portions of the document, identifying a normal signature as a most commonly assigned signature for text fragments of that selected portion; and
    excluding text fragments assigned the normal signature from at least he identifying and detecting.

9. The method as set forth in claim 8, wherein the plurality of selected portions of the document are pages of the document.

10. The method as set forth in claim 1, further comprising:
grouping a selected number of contiguous detected captions as an annotation.

11. A method for detecting captions in a document that includes text fragments and objects of interest, the method comprising:
assigning a signature to each text fragment, the signature being the value for that text fragment of a text fragment representation comprising at least one text fragment attribute;
computing a near property for each text fragment, the near property having a near value if the proximity of the text fragment to at least one object of interest in the document satisfies a near criterion and a value other than the near value otherwise, wherein the near criterion is satisfied conditional upon there being no intervening text fragments between text fragment for which the near property is being computed and at least one object of interest;
identifying a caption signature as a signature assigned to a substantial number of text fragments that are near at least one object of interest in the document, the near property being used in the identifying to recognize text fragments that are near at least one object of interest in the document; and
detecting one or more captions as one or more text fragments each assigned a caption signature.

12. The method as set forth in claim 11, further comprising:
conditional upon the identifying initially not identifying any caption signatures, repeating the assigning and identifying wherein the repeated assigning employs a different text fragment representation.

13. The method as set forth in claim 12, wherein the different text fragment representation comprises the initial text fragment representation with at least one additional text fragment attribute.

14. The method as set forth in claim 11, wherein the document includes objects of a plurality of different object types, and the objects of interest include all objects in the document regardless of object type.

15. The method as set forth in claim 11, further comprising:
conditional upon the identifying initially not identifying any caption signatures, repeating the computing of the near property and the identifying wherein the repeated computing of the near property employs a different near criterion.

16. The method as set forth in claim 11, further comprising:
for each of a plurality of selected portions of the document, identifying a normal signature as a most commonly assigned signature for text fragments of that selected portion; and
excluding text fragments assigned the normal signature from at the identifying and detecting.

17. A system for detecting captions in a document that includes text fragments and objects of interest, the system comprising:
a signatures assignor configured to assign for each text fragment a signature comprising the value for that text fragment of a text fragment representation comprising at least one text fragment attribute;
a near property processor configured to assign a near property for each text fragment, the near property having a near value if the position of the text fragment respective to objects of interest in the document satisfies a near criterion and a value other than the near value otherwise;
a caption signature identifier configured to identify at least one caption signature based on the near property values of text fragments assigned that signature;
a caption detector configured to identify as captions those text fragments assigned the caption signature; and
a text fragment representation refiner configured to refine the text fragment representation responsive to the caption signature identifier failing to identify at least one caption signature, the signatures assignor and caption signature identifier being re-applied using the refined text fragment representation.

18. The system as set forth in claim 17, wherein the document includes object of a plurality of different object types, and the objects of interest include objects of all object types.

19. A system for detecting captions in a document that includes text fragments and objects of interest, the system comprising:
a signatures assignor configured to assign for each text fragment a signature comprising the value for that text fragment of a text fragment representation comprising at least one text fragment attribute;
a near property processor configured to assign a near property for each text fragment, the near property having a near value if the position of the text fragment respective to objects of interest in the document satisfies a near criterion and a value other than the near value otherwise;
a caption signature identifier configured to identify at least one caption signature based on the near property values of text fragments assigned that signature;
a caption detector configured to identify as captions those text fragments assigned the caption signature; and
a normal text fragments filter that identifies a most common signature in at least a portion of the document as a normal signature, the caption signature identifier being configured to exclude the normal signature from consideration as a caption signature.

20. A method for detecting captions in a document that includes text fragments and objects of interest, the method comprising:
identifying a caption signature correlative with text fragments that are near at least one object of interest, the caption signature being a value of a text fragment representation comprising at least one text fragment attribute, wherein the identifying includes:
assigning a signature to each text fragment of the document, the signature being the value of the text fragment representation for that text fragment,
assigning a near property to each text fragment of the document, the near property indicating whether the text fragment is near at least one object of interest,
for each signature, determining association scores indicating an extent of association between text fragments assigned that signature and the near property, and
identifying one or more caption signatures based on the association scores; and
detecting one or more captions as one or more text fragments for which the value of the text fragment representation equals the caption signature.

21. The method as set forth in claim 20, wherein the text fragment representation comprises at least one text fragment style attribute.

22. The method as set forth in claim 20, wherein the text fragment representation comprises at least one of text fragment content attribute.

* * * * *